Jan. 5, 1937. R. B. WORDEN 2,066,815
FISH LURE
Original Filed Dec. 21, 1933
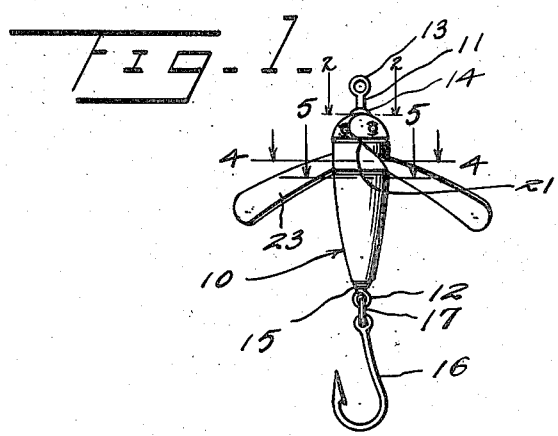
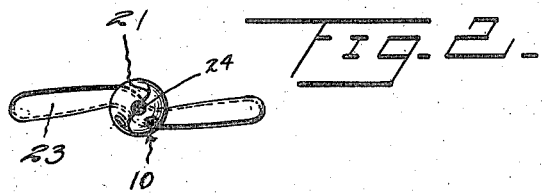
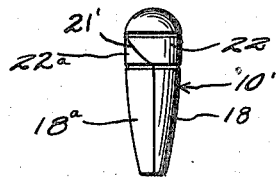
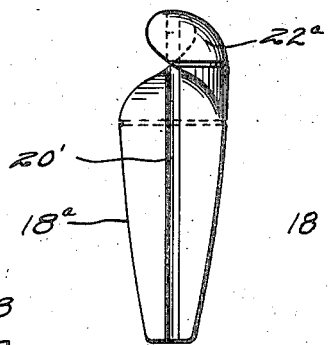
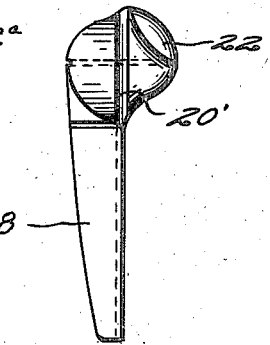
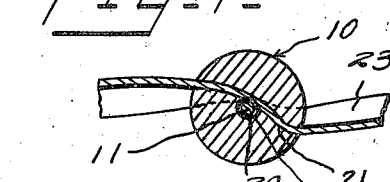
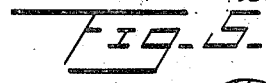
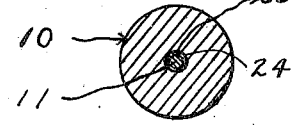
Inventor
R. B. Worden
By Watson E. Coleman
Attorney Patented Jan. 5, 1937

2,066,815

UNITED STATES PATENT OFFICE 2,066,815

FISH LURE

R. B. Worden, Granger, Wash.

Application December 21, 1933, Serial No. 703,480
Renewed June 9, 1936

8 Claims. (Cl. 43—47)

This invention relates to fish lures and more particularly to an improved lure and a method of constructing the same.

An object of this invention is to provide an improved lure, the body of which is constructed in a manner to permit the use of a unitary wing or blade structure for rotating the lure about a shaft having a hook secured thereto.

Another object of this invention is to provide an improved fish lure which is so constructed as to permit the use of a single wing or blade structure which is held in desired angular relation relative to the body of the lure by means of a spirally constructed slit in one end of the body.

A further object of this invention is to provide a lure, the body of which is constructed of two interlocking members which have the interlocking portions thereof disposed on an angle to the longitudinal axis of the body so as to dispose the wings or blades on the desired pitch relative to the body.

The above and various other objects and advantages of this invention will in part be described and in part be understood from the following detailed description of the present preferred embodiment, the same being illustrated in the accompanying drawing wherein:—

Figure 1 is a detail side elevation of a lure constructed according to the preferred embodiment of this invention.

Figure 2 is a section taken on the line 2—2 of Figure 1.

Figure 3 is a modified form of body for a lure of this type.

Figure 4 is an enlarged fragmentary sectional view taken on the line 4—4 of Figure 1.

Figure 5 is an enlarged sectional view taken on the line 5—5 of Figure 1.

Figure 6 is an enlarged elevational view of the form of lure shown in Figure 3, showing the inside face of one of the interlocking body members.

Figure 7 is a side elevation of the other interlocking members.

Referring to the drawing wherein like numerals of reference designate corresponding parts throughout the several views, and more particularly to Figures 1, 2, 4, and 5, the numeral 10 designates generally the body of a lure having a shaft 11 extending longitudinally therethrough, which shaft is provided with an eye 13 at one end to which a fish line or the like may be attached. An eye 12 is mounted on the other end of the shaft 11 and beads or annular members 14 and 15 are disposed on opposite ends of the body 10 and secured to the shaft 11 so as to hold the body 10 against longitudinal movement on the shaft 11 while permitting free rotation of the body 10 on the shaft 11. A hook 16 may be secured to the eye 12 by means of a ring 17 or the like.

The body 10 of this lure is constructed in a manner to simulate the body of any selected insect or the like and is preferably of tapering construction with the enlarged head end portion thereof disposed adjacent the upper or forward eye 13. The reduced or rear end of the body 10 is disposed adjacent the eye 12 and the bead or annulus 15.

The body 10, as shown in Figures 1, 2, and 4, is provided with a bore 20 extending therethrough and a metal tube 24 is disposed in this bore and acts as a bearing for the shaft 11. The body 10 at the head or forward end thereof is provided with a spirally disposed slit 21, which winds about the bore 20 and the tube 24, and a wing or blade structure 23 of unitary construction is disposed in this slit 21 and the angular relation of the slit 21 will hold the blade structure 23 in desired angular relation so as to rotate the body 10 when the lure moves relative to the water.

Referring now to Figures 3, 6, and 7, wherein there is disclosed a modified form of this invention, the head of the body 10' comprises two complementary body portions 18 and 18ª each having spiral interlocking portions 22 and 22ª which extend spirally about the bore 20' and which form a spiral slit 21'. At a point adjacent the rear end of the spiral interlocking portions 22 and 22ª, a unitary wing or blade structure is adapted to be positioned in the same manner as the wing 23 shown in Figures 1 and 4.

The method of constructing the lure shown in Figures 1, 2, 4, and 5 is to bore the desired hole longitudinally through the body 10 so as to receive the metal tube 24, but before the tube 24 is inserted in this bore, the forward end of the body 10 is slit in a spiral manner and the blade structure 23 is then inserted in this slit 21. The tube 24 is then placed in the bore 20 and this tube 24 will slightly compress the blade structure 23 and will thereby hold the blade 23 against lateral movement relative to the body 10.

The method of constructing the lure disclosed in Figures 3, 6, and 7 comprises the initial turning of the body 10' into the desired round body and boring a hole or opening longitudinally therethrough and axially of the body of a sufficient size to receive the tube 24, so that the body 10' will freely rotate on a shaft. The body is then split longitudinally through substantially the center thereof for a portion of its length and, in the present instance, for the greater portion of its length, the body being split in half from the small or rear end thereof in the direction of the head. At the desired point in the length of the body, the body is then split or cut to form the spiral interlocking members 22 and 22ᵃ which extend spirally about the bore 20'. The outer surface of the body, after the wings have been disposed between the rear portions of the interlocking members 22 and 22ᵃ, may then be suitably colored, painted or the like, so that the lure will simulate the desired insect and the wings may be constructed of the desired material, preferably of material which has a degree of flexibility so that it will readily flex between the interlocking portions of the members 22 and 22ᵃ. The split portions of the body 10' may then be suitably glued together by glue which is impervious to water, or held together in any other desired manner such as wrapping or the like.

When the lure herein disclosed is drawn through the water or is held stationary and the water moves relative to the lure, the blades 23 will cause the body 10 to rotate and thereby attract any fish closely adjacent thereto or within sight of the lure.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A lure comprising a body, a unitary blade structure extending transversely of and through the body, said body having a spirally disposed slit in one end thereof to incline said blade structure relative to the longitudinal axis of the body.

2. A lure as set forth comprising a body substantially round in transverse section, said body having a bore extending longitudinally therethrough and also having a spirally disposed slit therein extending from one end of the body, said slit extending about and communicating with said bore, and a unitary wing structure extending transversely through the body and disposed in said slit.

3. A lure as set forth comprising a body substantially round in transverse section and having a bore extending longitudinally therethrough, said body also having a spirally disposed slit therein extending from one end and terminating intermediate the ends of the body, said slit extending about and communicating with said bore, and a tube disposed in said bore and engaging said wing structure to frictionally hold said wing structure against lateral movement relative to the body.

4. A lure as set forth comprising a body substantially round in transverse section and having a bore extending longitudinally therethrough, said body also having a spirally disposed slit extending from one end thereof and terminating intermediate the opposite end, said slit communicating with and extending about said bore, a unitary wing structure extending transversely of the body and disposed in said slit, a tube extending longitudinally through the body and engaging said wing structure within said slit to frictionally hold said wing structure against movement relative to the body, a shaft extending through said tube, said shaft having an eye at each end and a hook secured to one of said eyes.

5. A lure as set forth comprising a body, laterally extending wings carried by the body and a shaft loosely extending through the center of the body, said body comprising complementary portions each portion having a flat inner face portion for a portion of the length thereof, and a curved face portion for the remaining length thereof, the curved face portions of each member interlocking one with another.

6. A lure as set forth comprising a body substantially round in transverse section, said body having a bore extending longitudinally therethrough and also having a spirally disposed slit therein extending from one end of the body and a unitary wing structure extending transversely through the body and disposed in said slit.

7. A lure as set forth comprising a body substantially round in transverse section and having a bore extending longitudinally therethrough, said body also having a spirally disposed slit therein extending from one end and terminating intermediate the ends of the body and a tube disposed in said bore.

8. A lure as set forth comprising a body substantially round in transverse section and having a bore extending longitudinally therethrough, said body also having a spirally disposed slit extending from one end thereof and terminating intermediate the opposite end, a wing structure extending transversely of the body and disposed in said slit, a tube extending longitudinally through the body within the bore, a shaft extending through said tube, said shaft having an eye at each end and a hook secured to one of said eyes.

R. B. WORDEN.